US012791981B2

(12) United States Patent
Conus et al.

(10) Patent No.: US 12,791,981 B2
(45) Date of Patent: Nov. 10, 2026

(54) DEVICE FOR GUIDING A SHAFT OF A SPRUNG BALANCE

(71) Applicant: ETA SA Manufacture Horlogère Suisse, Grenchen (CH)

(72) Inventors: Thierry Conus, Lengnau (CH); Raphaël Courvoisier, Corcelles (CH); Jean-Luc Helfer, Le Landeron (CH); Sylvain Huot-Marchand, Eschert (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 910 days.

(21) Appl. No.: 18/170,009

(22) Filed: Feb. 16, 2023

(65) Prior Publication Data

US 2023/0288878 A1 Sep. 14, 2023

(30) Foreign Application Priority Data

Mar. 11, 2022 (EP) .................................... 22161628

(51) Int. Cl.
*G04B 31/02* (2006.01)

(52) U.S. Cl.
CPC .................................... *G04B 31/02* (2013.01)

(58) Field of Classification Search
CPC ...... G04B 31/02; G04B 31/08; G04B 31/004; G04B 17/063; G04B 17/32; G04B 17/34; G04B 31/0087; G04B 31/04; G04B 17/06
See application file for complete search history.

(56) References Cited

U.S. PATENT DOCUMENTS

| | | | | |
|---|---|---|---|---|
| 8,939,639 | B2 * | 1/2015 | Heise | G04F 7/0842 368/127 |
| 10,114,341 | B2 * | 10/2018 | Conus | G04B 17/06 |
| 11,561,512 | B2 * | 1/2023 | Isambert | G04B 17/285 |
| 2014/0313865 | A1 | 10/2014 | Heise | |
| 2018/0284698 | A1 | 10/2018 | Cettour-Baron et al. | |

FOREIGN PATENT DOCUMENTS

| | | |
|---|---|---|
| CH | 700 496 B1 | 9/2010 |
| CH | 705 906 A2 | 6/2013 |
| CH | 708 089 B1 | 7/2017 |

(Continued)

OTHER PUBLICATIONS

Machine Translation of CH 705906 (Year: 2013).*
European Search Report for EP 22 16 1628 dated Sep. 2, 2022.

*Primary Examiner* — Edwin A. Leon
(74) *Attorney, Agent, or Firm* — Sughrue Mion, PLLC

(57) ABSTRACT

A device (1) for guiding a rotary shaft (6) of a sprung balance, including the rotary shaft and a guide bearing (2) for guiding an end of the rotary shaft. The guide bearing includes a blade (3) and a surface (5) for coming into contact with and holding the end of the rotary shaft of the sprung balance. The contacting parts are made of a material with a Young's modulus of less than or equal to 100 GPa and/or to reduce the coefficient of friction of the contacting parts. The device also includes a solid body (15) with a guide opening, such as a hole jewel (15), disposed along the axis of the rotary shaft (6) in a centred position. An end of the shaft passes through the opening without too much angular play caused by the effect of gravity.

25 Claims, 3 Drawing Sheets

(56) References Cited

FOREIGN PATENT DOCUMENTS

| | | | |
|---|---|---|---|
| EP | 2 142 965 | B2 | 2/2014 |
| EP | 3 106 933 | A1 | 12/2016 |
| FR | 3 039 292 | A1 | 1/2017 |
| JP | 2018-200303 | A | 12/2018 |
| KR | 10-2014-0125315 | A | 10/2014 |
| WO | 2021/121707 | A1 | 6/2021 |

* cited by examiner

DEVICE FOR GUIDING A SHAFT OF A SPRUNG BALANCE

CROSS REFERENCE TO RELATED APPLICATIONS

This application is claiming priority based on European Patent Application No. 22161628.7 filed on Mar. 11, 2022.

TECHNICAL FIELD

The invention relates to a device for guiding a rotary shaft of a sprung balance of a timepiece.

The invention further relates to a horological movement and a timepiece respectively comprising such a device for guiding a rotary shaft of a sprung balance.

TECHNOLOGICAL BACKGROUND

Use of a sprung balance constituting a mechanical oscillator is known in the horological field, the oscillation frequency of which mechanical oscillator can be adjusted electronically or mechanically by a going train connected to a barrel system. The pivot at one end of the shaft can be guided generally by passing through a circular guide opening but with a certain degree of play. Under these conditions, positioning is seen to be rather imprecise and a high level of friction is observed, which is dependent on the position of the watch, which is capable of quickly causing wear to said pivot and of altering the chronometric precision of the watch, which is a drawback.

The Swiss patent document No. 239 786 discloses a device for guiding a pivot at one end of the rotary shaft of a sprung balance. The device is arranged with an olive stone and a stop that is inclined relative to the shaft of the balance. The shaft is guided without any play. Friction is thus independent of the position of the watch. In a horizontal position of the watch, the additional friction of the cylindrical part of the pivot against the olive stone is thus similar to that experienced in a vertical position. However, the amplitude is lower for all positions, which is a drawback in terms of precision control.

The production of a rotary shaft of a sprung balance made of a ceramic material is also known from the European patent document No. 3 258 325 B1 and Swiss patent document No. 269 552, which aims to prevent wear from occurring too quickly at the ends of the rotary shaft in a guide member.

The European patent document No. 3 382 472 A1 discloses a guide bearing for a pivot of a rotary shaft of a sprung balance of a timepiece. A guide bearing can be provided on either side of the ends of the rotary shaft. In one embodiment, the guide bearing can consist of three evenly spaced, spiral-shaped, curved blades, a first end of each blade whereof is fastened to a ring coaxial with the rotary shaft, whereas a second end of each blade comes into contact with one end of the rotary shaft of the balance to hold it radially. The guide bearing is made of a metal material. The guide bearing made of a metal material does not sufficiently reduce the forces when in contact with the shaft or with the pivot on the shaft. Under these conditions, there is too much energy loss, mainly due to friction with the end of the pivot or of the rotary shaft, even if the friction is no longer really dependent on the orientation of the watch, which is a drawback.

It should also be noted that the "open" geometry of the guide bearing does not allow the liquid lubrication conventionally deposited between the hole jewel and the endstone of a conventional shock-absorber bearing to be retained. In the present case, the oil will migrate along the pivot and then the shaft. Eventually, the pivot will rub "dry" in its bearing, which will further accelerate wear thereto.

Depending on the orientation of the timepiece with a mechanical movement, the running of the timepiece mechanism can be affected by gravity. Reference can be made in this respect to the Swiss patent document No. 707 501 A2, which discloses a device for guiding a horological shaft. To avoid the rotary shaft from having too much angular play, at least one pivot pin at one end of the shaft passes through a hole jewel fixed in a setting and an endstone which includes a support surface receiving the end of said pivot. The hole in the jewel through which the pivot passes has a diameter that is substantially greater than the diameter of the pivot so as to leave it free to move very slightly depending in the orientation of the timepiece and mainly depending on gravity. The support stone can be slightly tilted to position the pivot of the shaft inside the hole of the hole jewel with a small amount of angular play, but avoiding excessive angular offsets at the ends of the shaft as a result of gravity. In the present case, the shaft is not held in a well-centred position.

The Swiss patent document No. 705 906 A2 discloses a shock-absorbing bearing for a shaft of a wheel set of a timepiece. This shaft comprises a shank and the bearing includes a support with a recess intended to receive a pivot system into which the shank is inserted. The pivot system is arranged to partially absorb the impacts experienced by the timepiece wheel set. The pivot is made of a part coated, at least on the surface thereof, with a polycrystalline material. However, it is not suitable for reducing friction and the effects of gravity and with limited play for guiding the shaft.

SUMMARY OF THE INVENTION

The main purpose of the invention is thus to overcome the drawbacks of the prior art by providing a device for guiding a rotary shaft of a sprung balance with limited play of the shaft resulting from gravity and with the contact parts of the guide member having a material and geometry that are selected so as to reduce the bearing forces and thus the friction forces.

To this end, the invention relates to a device for guiding a rotary shaft of a sprung balance, which comprises the features defined in the independent claim 1.

Specific embodiments of the device for guiding a rotary shaft of a sprung balance are also described in the dependent claims 2 to 21.

One advantage of the device for guiding a rotary shaft of a sprung balance lies in the fact that at least one end of the rotary shaft, for example at one end of the rotary shaft or a pivot fastened to one end of the rotary shaft, passes through a guide opening in a solid body, such as a hole jewel. The diameter of the hole is very slightly greater than the diameter of an end arbor of the shaft or pivot fastened to the shaft so as to allow for slight play.

Advantageously, at least the contacting parts of the shaft, or of a pivot fastened to the shaft, and of a guide bearing for the shaft are:

- made of a material with a Young's modulus of less than or equal to 100 GPa so as to reduce friction forces, and/or
- made with, or coated with, materials having a coefficient of friction therebetween of less than 0.15, or 0.1, or even 0.05.

Preferably, the material can be ceramic or glass or also a filled or non-filled polymer, to produce in particular the one or more blades for guiding and holding the guide bearing of the device in contact with one end of the rotary shaft of the sprung balance. In addition to the material selected, a machining precision within a defined tolerance range must still be obtained. The geometry of the one or more blades can also be adapted so as to minimise the area in contact with the end of the shaft or of the pivot on the shaft.

The invention further relates to a horological movement comprising such a device as defined in claim 22.

The invention further relates to a timepiece comprising such a device as defined in claim 23.

BRIEF DESCRIPTION OF THE FIGURES

The aims, advantages and features of a device for guiding a rotary shaft of a sprung balance will appear more clearly in the following description, in particular with reference to the drawings in which.

DETAILED DESCRIPTION OF THE INVENTION

Figure 1:
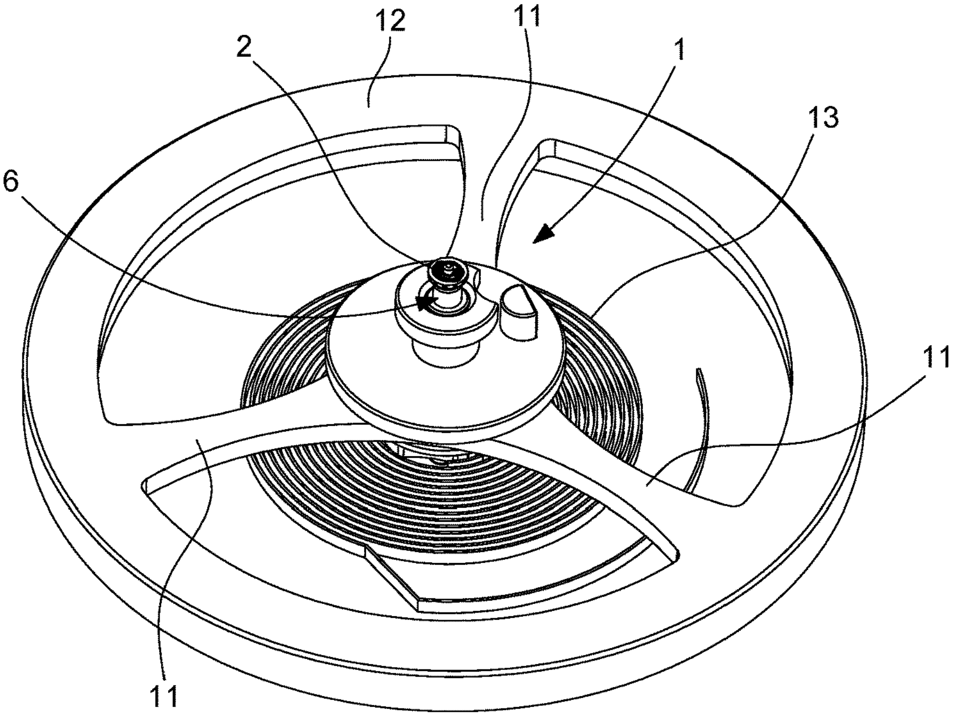
FIG. 1 shows a three-dimensional top view of a sprung balance with part of the device for guiding the rotary shaft of the sprung balance.

In the following description, all components or elements of the device for guiding a rotary shaft of a sprung balance are generally known. These elements or components will thus only be described briefly. It should firstly be noted that the device for guiding a rotary shaft of the sprung balance further comprises said shaft which forms a part of a whole with the guide elements of this shaft and means to avoid the effect of gravity. It goes without saying that mention can also be made of an assembly comprising at least one guide bearing and the rotary shaft of the sprung balance to define the device for guiding a rotary shaft of the sprung balance.

In the following description of the device for guiding a rotary shaft of a sprung balance, a guide bearing can be provided, which can consist of contact parts such as flexible blades for example for positioning the axis of the sprung balance. This in particular limits the parasitic motions of the sprung balance when the movement is in a horizontal position. In general, the motions generated are responsible for chronometric errors. In one embodiment with the flexible blades, these blades have a centring effect on the axis of rotation of the sprung balance.

The friction forces between horizontal and vertical positions of the horological movement can also be balanced according to the invention. Friction losses are generally responsible for decreases in amplitude and thus for differences in chronometric rate due to the intrinsic anisochronism of the sprung balance system. If equivalent losses are observed regardless of the horizontal or vertical position, a good precision is obtained for the movement, regardless of the spatial position thereof.

According to the present invention as described hereinbelow, a solid body with a guide opening can be used in combination with the guide bearing of the rotary shaft of the sprung balance. This means that when the movement is in a vertical position, the shaft of the balance lies in the guide opening of the solid body. This allows the radial displacement of the balance to be mechanically limited other than by the mere stiffness of the blades. A larger radial displacement has a highly detrimental effect on timing.

According to the present invention, a pivot system in a closed space can also be conceived, allowing a lubricant to be used, in contrast to that described in the prior art, where a so-called open system is used, which is generally incompatible with lubrication. An added lubricant minimises friction losses, which has the advantage of allowing guide bearing blades to be incorporated, which can be stiffer but also easier to handle when assembling the components.

As will be described hereinbelow according to the present invention, the use of components made of polymer materials is advantageous. These components are, for example, produced for flexible or resilient blades in a guide bearing, or also for coating contact parts of such guide bearings. Instead of flexible or resilient blades or contact parts, an elastomer with friction surfaces made of a material that is better adapted for friction with adequate inserts can also conceivably be used.

Figure 2:
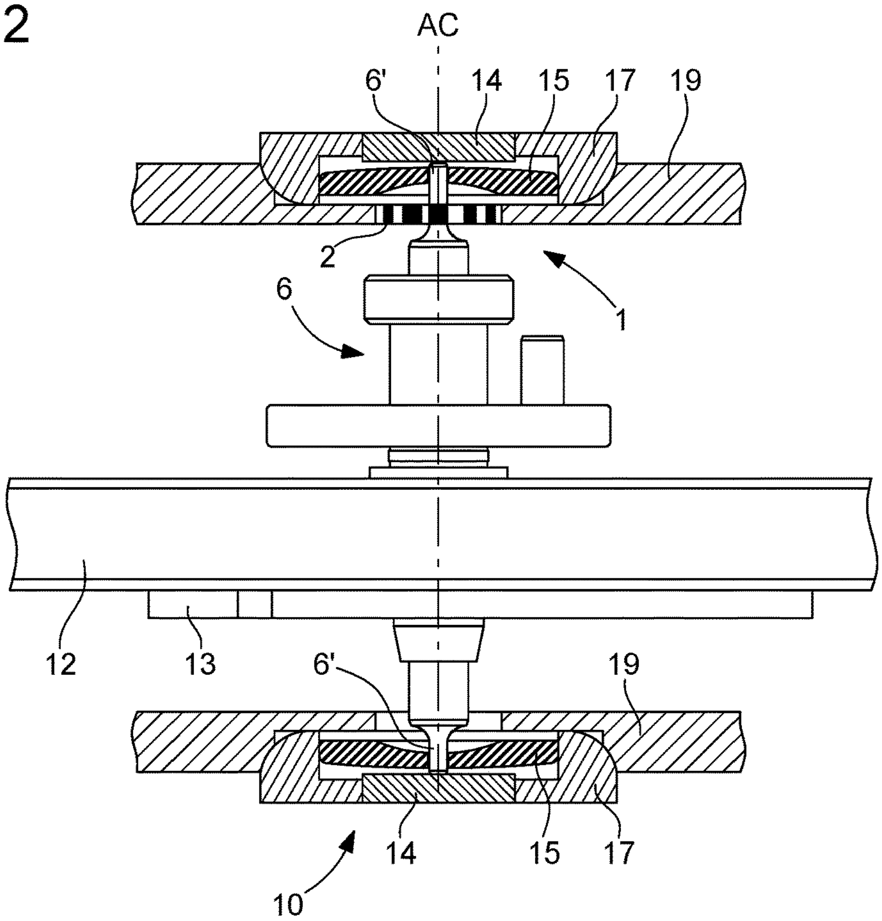
FIG. 2 shows a vertical side view of a partial section of the sprung balance with the device for guiding the rotary shaft, counteracting the effect of gravity according to the invention.

FIGS. 1 and 2 show the sprung balance with the device 1 for guiding the rotary shaft assembly of said sprung balance in a simplified manner in FIG. 1 and with means for reducing the effect of gravity in FIG. 2. The sprung balance is formed by a rim 12 connected, for example, by three arms 11 to a central rotary shaft 6, and a balance spring 13, having a first end connected to a stud (not shown) of a bridge of the balance. A second end of the balance spring 13 is fastened directly, or indirectly via a collet, to the rotary shaft 6 of the sprung balance.

The device 1 for guiding the rotary shaft 6 of the sprung balance comprises said rotary shaft 6 and at least one guide bearing 2 preferably disposed at one end of the rotary shaft 6. It goes without saying that two guide bearings 2 for the rotary shaft disposed at the two ends of the rotary shaft can be considered, in particular to centre the rotary shaft 6 along the central axis AC.

FIG. 2 comprehensively defines the device 1 for guiding a rotary shaft 6 with one or more means 10 for reducing the effect of gravity, which are provided so as to keep the rotary shaft well-centred, and which are disposed at least at one end of the rotary shaft. Preferably, at least one end of the rotary shaft comprises a pivot 6' fastened to or directly made in one piece with the shaft on the side of one end of the rotary shaft. The end of the pivot 6', which takes the form of a cylindrical arbor for example, is inserted into the opening in a solid body 15, such as a pierced jewel or a hole jewel. The solid body 15 with a guide opening will act as a stop to limit the travel of the pivot in the xy plane, which is the plane normal to the AC axis or, as mentioned hereinbelow, to limit the angular play. It thus provides a means for reducing the displacements of the shaft resulting from the effect of gravity depending on the orientation of the timepiece, in particular when the timepiece is positioned vertically.

The diameter of the opening of the solid body 15 with a guide opening, such as a hole jewel, is preferably slightly greater than the diameter of the arbor of the pivot 6' so as to allow the rotary shaft 6 to have a possible angular play of less than 3°, but a radial play which must be small enough to reduce the effect of gravity depending on the orientation of the timepiece.

According to a more advantageous embodiment, the opening of the solid body 15 with a guide opening, such as a pierced jewel or hole jewel, is centred on the axis AC of the rotary shaft 6, and the same applies to the guide bearing 2 of the rotary shaft 6, which can be disposed on the inside of the timepiece and beneath the solid body 15 with a guide opening. The solid body 15 with a guide opening, which can be a hole jewel 15 for example, is in principle held in a setting 17 housed in a block 19, which is itself fastened to a blank of the timepiece (not shown). The setting 17 further includes an end-piece 14 for supporting the end of the pivot 6' fastened to or made in one piece with the shaft at the end of the rotary shaft 6. The end-piece 14 is mounted substantially parallel to the solid body 15 and on a side opposite the guide bearing 2. This end-piece 14 can be held in place by resilient means (not shown).

Insofar as two means for reducing the effect of gravity are provided at each end of the rotary shaft 6 or of the pivots 6' fastened to the ends of the rotary shaft 6, each end arbor of the rotary shaft 6 or of the pivots 6' passes through the respective through-opening in the solid body 15 to come, as the case may be, into direct contact with the respective end-piece 14.

A solid body 15 with a guide opening can be made of any type of solid material, for example metal, ceramic, or any type of hard material that is easily made or machined.

According to the embodiment shown in FIG. 2, two means 10 for reducing the effect of gravity are disposed on the side of the two ends of the rotary shaft, and a guide bearing 2 is mounted on the side of an upper end of the rotary shaft 6, for example on the dial side. Typically, a pivot 6' is made at each end of the rotary shaft 6 as a single piece with the rotary shaft. However, the pivot 6' can also be fastened to the end of the rotary shaft 6. In both cases, each pivot 6' has a cylindrical end arbor to be inserted with a certain degree of play into each respective guide opening in the one or more solid bodies 15.

Two guide bearings 2 respectively mounted on the side of each end of the rotary shaft 6 can also be provided, for example at the location of two pivots 6' respectively fastened to the ends of the rotary shaft 6 or made in one piece with the rotary shaft to form a one-piece structure. Each guide bearing 2, described in more detail with reference to FIGS. 3 and 4 hereinbelow, comprises contact parts for coming into contact with and holding the ends of the rotary shaft, since the rotary shaft 6 connected to the sprung balance is always undergoing an alternating rotary motion in normal operation relative to the guide bearing 2, which is fixedly mounted in or on at least one static member, which can be a blank, or preferably the block 19 or more preferably the setting 17.

At least all of the contacting parts of the guide bearing 2 and of the rotary shaft 6 are advantageously made of a material with a modulus of elasticity (Young's modulus) of less than or equal to 100 GPa. Preferably, the material can be selected from ceramic, glass or a filled or non-filled polymer, and a list of these materials will be given in more detail in the second part of the detailed description. Moreover, in order to counteract the effect of gravity, a radial displacement limiting element such as a solid body 15 with a guide opening is required, which can be, for example, a hole jewel to prevent the rotary shaft 6 from having too much play depending on the orientation of the timepiece. Finding materials to reduce the coefficient of friction of the contact between these materials for guiding the rotary shaft 6 is further preferred.

Figure 3A:
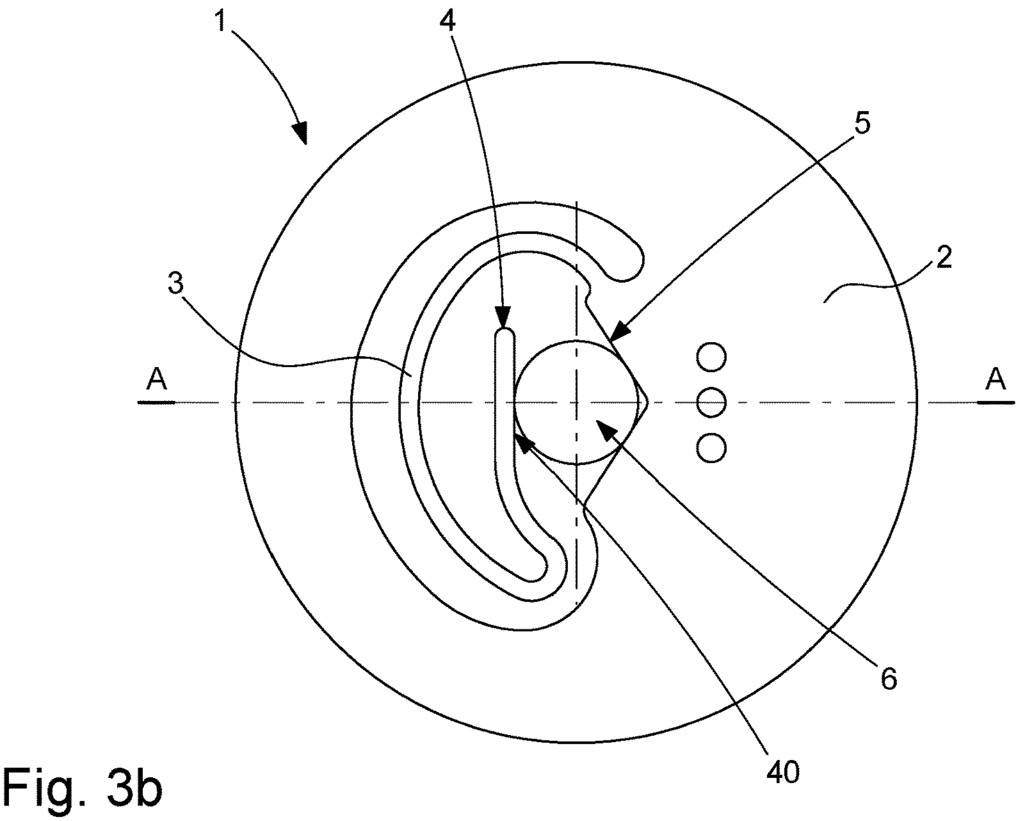
FIGS. 3*a*, 3*b* and 3*c* show a simplified top view of a first embodiment of a guide bearing of the device for guiding the rotary shaft according to the invention, and two cross-sectional views along A-A of two alternative embodiments of the guide bearing.
Figure 3B:
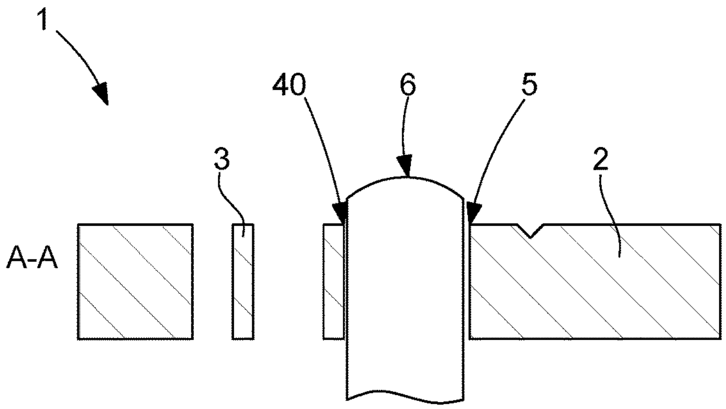
Figure 3C:
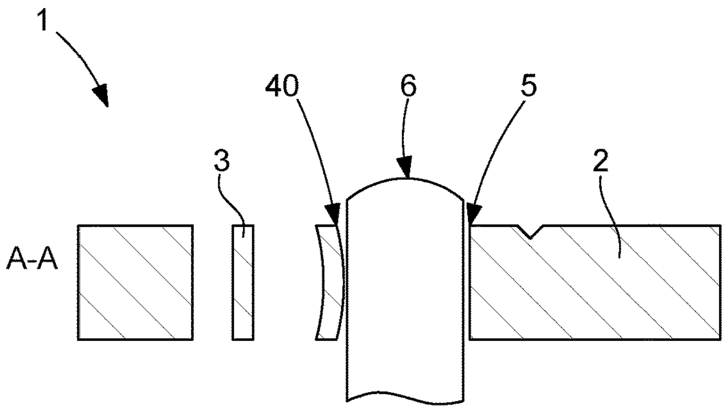

FIGS. 3*a*, 3*b* and 3*c* show a first embodiment of the guide bearing 2 for guiding the rotary shaft 6 connected to the sprung balance. The overall shape of the guide bearing 2 is peripherally cylindrical overall so as to be housed and fastened inside a blank, or the block 19 or even more preferably, the setting 17. In a central part of the guide bearing 2, where the guiding and holding of the rotary shaft 6 will take place, at least one guide blade 3 is provided for contact, at one of the ends 4 thereof, with the rotary shaft 6 or on a part added to the rotary shaft, which can be a pivot.

According to the invention in this first embodiment, at least one guide bearing 2 includes, on a first side of the central axis AC, a support part 5, which is a support surface 5 of any geometric shape adapted to make a single contact point or a contact line with the rotary shaft 6 or the pivot mounted on the rotary shaft. The support surface can also be V-shaped, or a bearing, or the like, and is arranged to centre the axis of rotation of a shaft 6 on a bisecting plane of the support surface 5. This support surface 5 is symmetrical. The same guide bearing 2 includes, on a second side of the axis of revolution, which is opposite the first side, at least one holding element 4 at the free end of the blade 3, which is disposed substantially diametrically opposite the support surface 5. It is understood that the support surface 5, which is symmetrical relative to the bisecting plane thereof, includes two elementary support surfaces, in this case a V-shaped surface.

According to the invention, all the holding elements 3, 4 for holding contact with the contact surface 40 are arranged to exert a resultant resilient return force, on a shaft 6, directed towards the central axis AC, and to prevent a shaft 6 inserted axially in the direction of the axis of revolution in this guide bearing 2 from radially exiting this guide bearing 2.

However, it should be noted that a single blade 3 with a contact surface 40 to hold the rotary shaft against the V-shaped surface 5 is difficult to produce because, depending on the orientation of the timepiece, the sprung balance is too heavy to be held by the sole blade provided.

In FIG. 3*b*, the blade 3, up to the free end thereof, has a rectangular cross-section so as to have a planar contact portion 40 in contact with the end of the shaft 6 or of the pivot 6' on a contact line. However, in FIG. 3*c*, at least the free end of the blade 3 has a lenticular cross-sectional geometry so as to have only one contact point on the portion 40 to reduce friction when in contact with the end of the rotary shaft 6 or of the pivot mounted on the rotary shaft 6.

It should be noted that contact between the shaft 6 or the pivot and one or more support parts 5 in the form of a point or line of contact can be conceived. In the case of a contact point, each support part 5 can be made, for example, in the form of a domed structure or a ball portion. However, many other structures can be conceived in order to procure such a contact point. For a contact along a contact line, this can also be a cylindrical portion or structure of a support part disposed along an axis parallel to the axis of rotation of the rotary shaft or of any other structure. A combination of a contact point or contact line can be conceived. Moreover, any geometric shape can be proposed to make a contact point or contact line with the rotary shaft or the pivot mounted on the rotary shaft.

For further information on this first embodiment, reference can be made to the Swiss patent application No. 716 957 A2, in particular from paragraph [0021] to paragraph [0027], which describes guide bearings for a time indicator shaft.

Figure 4:
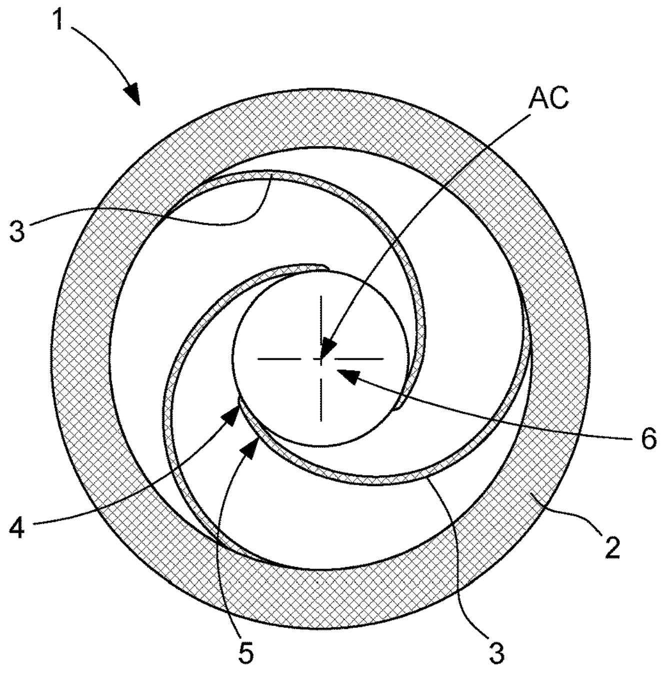
FIG. 4 shows a simplified top view of a second embodiment of a guide bearing of the device for guiding the rotary shaft according to the invention.

FIG. 4 shows a second embodiment of the guide bearing 2 of the device 1 for guiding the rotary shaft 6 of the sprung balance. This guide bearing 2 can comprise at least one contact blade 3 and two support parts 5, which are preferably two further contact blades 3. Thus, the guide bearing 2 is composed of a peripheral ring and of three blades 3 in the form of coils in order to move towards the rotary shaft 6 to come into contact with the rotary shaft 6 and hold and guide it along the central axis AC. The free end 4 of each blade 3 comes into direct contact with the rotary shaft 6 to hold, centre and guide it along the central axis AC. The three blades 3 can be of a different shape than the coils and have a cross-section that is not rectangular. For example, each blade is rectilinear, angularly disposed and evenly spaced 120° from one another in order for each to contact the rotary shaft in a homogeneous manner. More than three blades making contact with the rotary shaft can also be conceived.

The guide bearing 2 of this second embodiment can be obtained in one piece from a ceramic, glass or filled or non-filled polymer material, in particular below the threshold limit of the modulus of elasticity of less than or equal to 100 GPa and/or with the lowest possible coefficient of friction, for example less than or equal to 0.15. Moreover, the part of the rotary shaft 6 in contact with parts of the guide bearing 2 are made of the same or of a different material or coating fulfilling the conditions defined by the modulus of elasticity threshold or having the lowest possible coefficient of friction, for example at least less than or equal to 0.15.

For further information on this second embodiment, reference can be made to the European patent application No. 3 396 470 A1, from paragraph [0018] to paragraph [0022].

Figure 5:
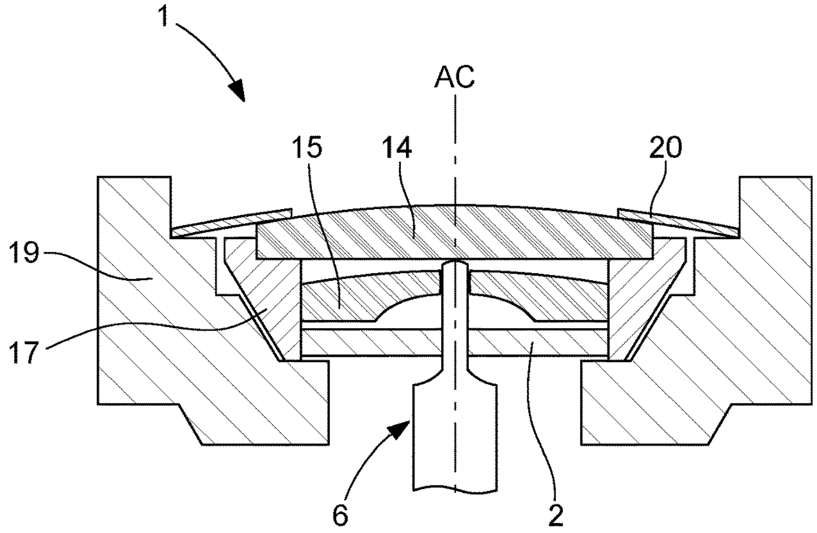
FIG. 5 shows a vertical side view of a cross-section of a device for guiding the rotary shaft of a sprung balance comprising, as in FIG. 2, at least one solid body with a guide opening, such as a hole jewel, acting in combination with the guide bearing of the rotary shaft to counteract the effect of gravity according to the invention.

FIG. 5 shows an embodiment of the device for guiding a rotary shaft 6, which device is substantially similar to that already described in FIG. 2. In these conditions, only the structure or the elements that differ from those already described in FIG. 2 are explained. The structure shown is diagrammatically that of a modified shock absorber with a guide bearing 2 of the guide device 1 according to the invention.

The guide device 1 thus comprises the guide bearing 2, the solid body 15 with a guide opening and the end-piece 14. The guide bearing 2 is the first element mounted at one end of the rotary shaft 6 or of the pivot 6' fastened to or made in one piece with the rotary shaft 6 at the end thereof. The solid body 15 with a guide opening is mounted above the guide bearing 2 on the end of the rotary shaft 6 or of the pivot 6', whereas the end-piece 14 is mounted above the solid body 15 on a side opposite the guide bearing 2 and above the end of the rotary shaft 6 or of the pivot 6'. The guide bearing 2, the solid body 15 with a guide opening and the end-piece 14 are mounted or fastened successively in a setting 17. The setting 17 is, for example, fixedly housed inside a block 19, which is itself fastened to a blank or plate of the timepiece (not shown).

In order to facilitate the mounting of the setting 17 prior to a possible fastening within an upper opening in the block 19, the setting 17 can comprise a conically-shaped peripheral part to be guided and centred in a complementary conically-shaped recess in the block 19. The setting 17 can also come to rest against a lower edge of the block 19. The setting 17 can further comprise a ring-shaped rim at the top surrounded by a cylindrical portion for mounting the endstone 14. Finally, this endstone 14 can be held in place with the other mentioned elements in the block 19 by resilient means 20, which can be in the form of a split metal ring of the hold-down spring type resting on an upper edge of the block 19. This split metal ring 20 can act as a base for the shock absorber of the guide bearing 2 of the guide device 1 according to the invention.

Figure 6:
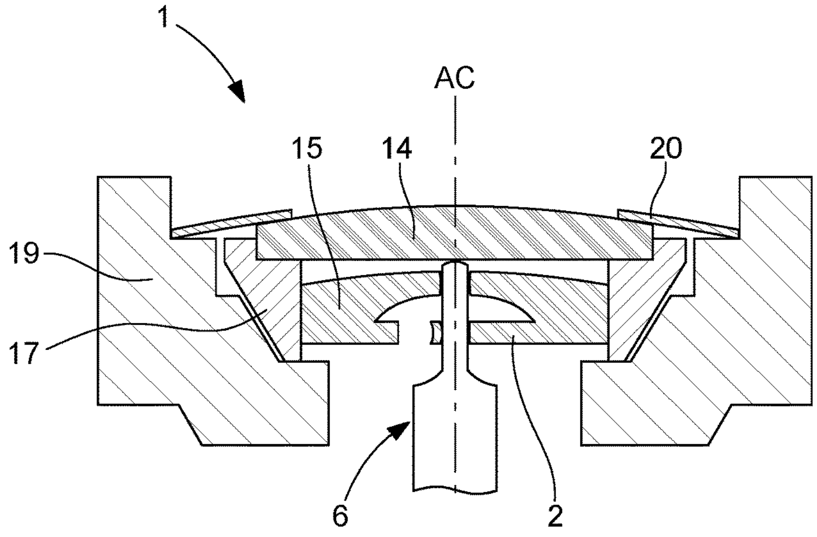
FIG. 6 shows a vertical side view of a cross-section of the device for guiding the rotary shaft which consists of an alternative embodiment of the guide bearing as shown in FIG. 3*a* and intrinsically linked to a solid body with a guide opening, such as a hole jewel, to form a one-piece structure in the alternative embodiment of FIG. 5.

According to an alternative embodiment shown in FIG. 6, the sole difference to that described in the embodiment of FIG. 5 is that the guide bearing 2 and the solid body 15 with a guide opening form a one-piece structure. This means that the solid body 15 with a guide opening and the guide bearing 2 are made of the same material and jointly form a compact one-piece assembly once produced. This one-piece structure of the bearing 2 and of the solid body 15 with a guide opening ensures precision in the machining and positioning of the guide elements and the guide opening in the solid body, while at the same time retaining the possibility of lubricating the contact elements in a conventional manner. In this scenario, the pivot system, which comprises the device 1 for guiding a rotary shaft, must be in an enclosed space.

It should also be noted that in the conventional manner of the components of a shock absorber assembly, the solid body 15 with a guide opening is typically driven into the setting 17, whereas the end-piece 14 is placed or mounted on an upper part of the setting 17. The ring-shaped spring 20 thus holds the end-piece 14 and the setting 17 in the block 19.

At least the contact parts of the guide bearing 2 or even of the solid body 15 with a guide opening can be made from a hard material so as to significantly reduce the friction forces.

The type of ceramics to be used for the guide bearing and/or the rotary shaft can be oxide-based ceramics, mainly alumina and zirconia, or silica.

Zirconium oxide ($ZrO_2$) can be used in yttria-stabilised zirconias ($ZrO_2+Y_2O_3$), which have a metastable tetragonal crystal structure, a grain size of less than 0.50 μm, a density of greater than 6.00 g/cm$^3$ and a hardness of about 1,200 HV. Zirconias can also be stabilised with cerium oxide ($ZrO_2+CeO_2$) or magnesium oxide (($ZrO_2$+MgO), depending on the properties of the desired final material.

With regard to Zirconia Alumina, composites are generally 80% 3Y-TZP/20% $Al_2O_3$(ATZ) or 90% $Al_2O_3$/10% 3Y-TZP (ZTA), combining the properties of high-purity zirconias and aluminas to procure final properties that offer the best of each material.

It should also be noted that the use of hard materials allows the contact friction forces of the contacting materials to be lowered or reduced, which can also be sought after.

Based on the description, which has just been given, multiple alternative embodiments of the device for guiding a rotary shaft of a sprung balance can be conceived by a person skilled in the art without departing from the scope of the invention defined by the claims.

The invention claimed is:

1. A device (1) for guiding a rotary shaft (6) of a sprung balance, the device comprising:

the rotary shaft (6);

a guide bearing (2) for guiding an end or a pivot (6') fastened to one end of the rotary shaft (6) of the sprung balance, the guide bearing comprising a blade (3) and a part (5) for coming into contact with and holding the end or the pivot (6') of the rotary shaft (6) of the sprung balance, at least one end part of the rotary shaft (6) or of the pivot (6') of the rotary shaft (6), or at least the contact parts (3, 5) of the guide bearing (2) being made of a material with a Young's modulus of less than or equal to 100 GPa and/or with a coefficient of friction of materials of the contacting parts or of the coating of the contacting parts of less than or equal to 0.15; and means for reducing the effect of gravity depending on an orientation of the device, the means for reducing the effect of gravity depending on the orientation of the device which is further comprising two solid bodies (15), respectively disposed at the two ends of the rotary shaft (6) to respectively receive, via a guide opening in each solid body (15), each end arbor of the rotary shaft (6) or of a pivot (6') of the rotary shaft (6) along an axis (AC) of the rotary shaft (6) in a centred position, a diameter of the opening in the solid bodies (15) being slightly greater than a diameter of each end arbor of the rotary shaft (6) or of the pivot (6') of the rotary shaft (6) to give the rotary shaft (6) limited angular play as a result of gravity depending on the orientation of the device, wherein the means for reducing the effect of gravity further comprise an end-piece (14) disposed at a distance from and parallel to the solid body (15) with a guide opening on a first side of the rotary shaft (6) and another end-piece (14) disposed at a distance from and parallel to the other solid body (15) on a second, opposite side of the rotary shaft (6), each end-piece being capable of being in contact with the end of the rotary shaft (6) or of the pivot (6') of the rotary shaft (6), and, in a direction that is along the axis (AC) and from the other end-piece (14) to the end-piece (14), the end-piece (14) is further away from the other end-piece (14) than are any and all portions of the solid body (15).

2. The device (1) according to claim 1, wherein the first solid body (15) with a guide opening and the first end-piece (14) are fastened to a setting (17) parallel to and at a distance from one another on a first, upper side, and wherein the second solid body (15) and the second end-piece (14) are fastened to another setting (17) parallel to and at a distance from one another on a second, lower side.

3. The device (1) according to claim 1, wherein a guide bearing (2) is fixedly mounted in or on a static member, which is a blank, or a block (19) or a setting (17).

4. The device (1) according to claim 3, wherein the guide bearing (2) and the solid body (15) with a guide opening are fixedly mounted in a lower part of the setting (17), which is itself fixedly mounted in a recess in the block (19), and wherein the end-piece (14) is mounted on an upper part of the setting (17).

5. The device (1) according to claim 4, wherein resilient means (20) hold the setting (17) and the end-piece (14) in the recess in the block (19).

6. The device (1) according to claim 5, wherein the resilient means includes a split annular spring to hold the end-piece (14) on the setting (17) and in the recess in the block (19).

7. The device (1) according to claim 1, wherein the solid body (15) with a guide opening comprises at least one of a metal, a ceramic material, and a jewel.

8. The device (1) according to claim 1, wherein an end-piece (14) comprises at least one of a metal, a ceramic material, and a jewel.

9. The device (1) according to claim 1, wherein the support part (5) is a support surface (5) structured so as to have a contact line or contact point against the shaft (6) or the pivot (6') to reduce friction.

10. The device (1) according to claim 1, wherein the support part (5) consists of two contact blades (3) for a total of three contact blades.

11. The device (1) according to claim 10, further comprising three contact blades (3), each of said three blades being coil-shaped, and wherein a first end of each blade is fastened to a ring (2) coaxial with the rotary shaft (6), whereas a second end (4) of each blade comes into contact with one end of the rotary shaft (6) of the balance to hold it axially.

12. The device (1) according to claim 10, wherein each of the contact blades (3) are rectilinear in shape, and wherein a first end of each blade is fastened to a ring (2) coaxial with the rotary shaft (6), whereas a second end (4) of each blade comes into contact with one end of the rotary shaft (6) of the balance to hold it axially.

13. The device (1) according to claim 11, wherein all of the blades are evenly spaced 120° apart from one another around the ring.

14. The device (1) according to claim 1, wherein a blade (3) or a support part (5) comprises a contact portion making contact with the shaft (6) or the pivot (6') and formed so as to have only a single point of contact with the shaft (6) or the pivot (6').

15. The device (1) according to claim 1, wherein each blade (3) comprises a contact portion making contact with the shaft (6) or the pivot (6') and formed so as to have only a single point of contact in order to reduce friction.

16. The device (1) according to claim 1, wherein a contact part of the shaft (6), the contact blade (3) and the support part (5) are made of the same ceramic, glass or filled or non-filled polymer material.

17. The device (1) according to claim 1, wherein a contact part of the shaft (6), the contact blade (3) and the support part (5) of the guide bearing (2) are made of two different ceramic, glass or filled or non-filled polymer materials.

18. The device (1) according to claim 16, wherein the elements of the guide bearing (2) are made in one piece.

19. The device (1) according to claim 1, wherein the guide bearing (2) and the solid body (15) with a guide opening form a one-piece structure.

20. The device (1) according to claim 1, wherein the coefficient of friction of the materials of the contacting parts or of the coating of the contacting parts is less than or equal to 0.1, or at least an end part of the shaft (6) or of the pivot (6') or at least the contact parts (3, 5) of the guide bearing (2) being made of a material with a Young's modulus of less than or equal to 100 GPa.

21. The device (1) according to claim 1, wherein the contacting parts of the guide bearing (2) and of the rotary shaft (6) or of the pivot (6') of the rotary shaft (6) are lubricated in an enclosed space of the device for guiding the rotary shaft (6).

22. A horological movement equipped with such a device (1) according to claim 1.

23. A timepiece provided with a movement equipped with such a device (1) according to claim 1.

24. The device (1) according to claim 1, wherein the guide bearing further comprises:

of the part (5), a V-shaped support surface configured to centre the axis (AC) of the rotary shaft (6), and a holding element (4) of the blade (3) pressing, in a direction that is across a surface of the guide bearing (2) and is perpendicular to the axis (AC), the rotary shaft (6) into the V-shaped support surface.

25. The device (1) according to claim 2, wherein the setting (17) comprises a conically-shaped peripheral part configured to be guided and centered in a complementary conically-shaped recess in the block (19).

* * * * *